Patented Mar. 11, 1941

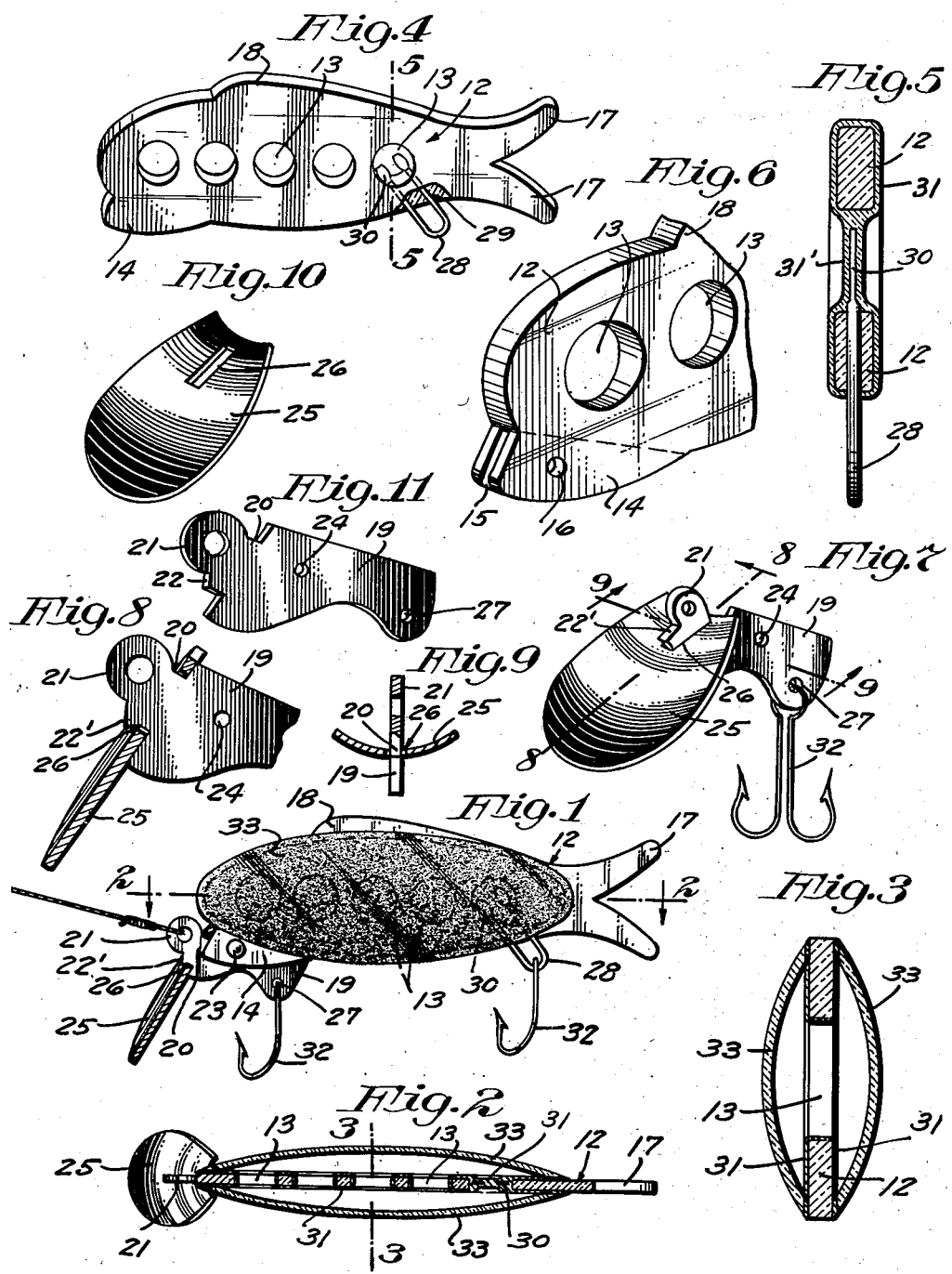

2,234,439

UNITED STATES PATENT OFFICE 2,234,439

FISH LURE

Karl R. Larson, Minneapolis, Minn.

Application July 24, 1939, Serial No. 286,101

9 Claims. (Cl. 43—46)

My invention provides an improved fish lure or artificial bait and also provides an improved process of producing the same. The invention is directed to a novel manner of making and assembling the parts of the bait, the advantageous use of metal and non-metallic materials, and certain features that improve the movement of the lure or bait when drawn through the water.

A commercial form of the device is illustrated in the accompanying drawing wherein like characters indicate like parts throughout the several views.

Referring to the drawing:

Fig. 1 is a side elevation of the improved lure, the spoon thereof being shown in section;

Fig. 2 is a horizontal section taken on the line 2—2 of Fig. 1;

Fig. 3 is an enlarged section taken on the line 3—3 of Fig. 2;

Fig. 4 is a perspective showing the center plate of the lure body;

Fig. 5 is an enlarged section taken on the line 5—5 of Fig. 4;

Fig. 6 is a perspective showing the front end portion of the center plate;

Fig. 7 is a perspective showing an attachment involving a line-attaching plate with an attached spoon and fish hook ready for application to the center plate;

Fig. 8 is a section taken on the line 8—8 of Fig. 7, some parts being broken away;

Fig. 9 is a section taken on the line 9—9 of Fig. 7; and

Fig. 10 is a perspective showing the spoon in detail; and

Fig. 11 is a perspective showing in detail the line-anchoring plate with the spoon removed therefrom.

Referring first to Fig. 4, the numeral 12 indicates a flat center plate that is preferably made quite thick and, hence, should be of material much lighter than metal. This plate has, in practice, been made from a cellulose sheet, such as shown to the trade as Celluloid or Bakelite, for example. This center plate is preferably formed with a large number of holes 13 which reduce the weight thereof, and one of which performs another important function presently to be noted.

At its front end the said plate 12 is formed with a projecting lip 14 that is centrally and longitudinally divided by a slot 15, and is perforated by a rivet-receiving hole 16. At its rear end the plate 12 has projecting tail fin-forming portions 17, and on its upper edge projects at 18 to form a top fin.

Fitted into the slot 15 is a thin line-attaching plate 19, the upper edge of which fits snugly against the straight bottom of the slot 15, and the front end of which projects to form a reduced neck 20, and beyond the neck a perforated line-attaching ear or eyelet 21. The neck 20, as shown in Fig. 11, has a shoulder-forming lug 22 that is adapted to be upset. The plate 19 is securely and firmly held in the slot 15 and to the flanges of the lip 14 by a rivet 23 passed through the rivet hole 16 and through a coincident rivet hole 24 in said plate 19.

The spoon 25, which is a thin concavo-convex sheet metal plate, is provided with a longitudinal slot 26, see particularly Fig. 10. This spoon is slipped on to the neck 20 of the plate 19 and the lug 22 is then upset, as shown at 22' in Fig. 8. When thus assembled, as shown in Figs. 7 and 8, the spoon will be securely anchored to the plate 19 but will be free for lateral wobbling or oscillatory movements in respect to said plate and in respect to the center plate 12 when the parts are assembled, as shown in Fig. 1. By reference particularly to Figs. 8 and 9, it will be noted that there is plenty of clearance between the spoon and the neck to permit the above noted wobbling movements of the spoon. It will also be noted that the attaching plate 19 is provided, at its rear end, with a perforated depending portion 27 for the application of a fish hook 28 thereto, as shown in Figs. 1 and 7.

For the application of a second or additional fish hook to the bait body, a novel hook anchoring device is provided. This anchoring device is in the form of a staple or U-shaped metal clip 28. The ends of this staple 28 are passed through parallel holes 29 formed in the lower edge of the rear portion of the center plate 12 with their ends extending into the rear hole 13. The ends of the staple within the hole 13 are upset or flattened as indicated at 30. The center plate, after the staple has been applied and its ends upset as described, will be dipped in a bath of cement, such as acetone, which forms a coating 31 over the entire face of said center plate and, moreover, forms webs at 31' across the perforations 13. The web formed in the rear perforation 13 embeds the flattened ends and firmly anchors the staple to the center plate. Of course, the flattened ends additionally prevent withdrawal of the staple. The staple 28 serves for the application of the additional hook 32.

The numeral 33 indicates side plates preferably made concavo-convex and which are outlined to represent the body proper of the fish bait. These plates 33 are preferably of the same material as the center plate, and at their edges are firmly attached with liquid-tight joints to the cement tissues or acetone coating 31. Acetone is a desirable kind of cement because it has for Celluloid, Bakelite and analogous materials very great affinity and, in fact, sort of a chemical action that makes it afford an extremely efficient and waterproof cement.

The purpose of a spoon as used in fish lures or bait is, as is well known, to cause the bait to make a tortuous or wobbling movement through the water in imitation of the movements of a fish; and for that purpose the spoon is employed in this bait. However, as I have found in practice, the imitation of the movement of a fish in the water can be greatly improved by permitting the spoon to have a limited wobbling action in respect to the bait body. This additional wobbling action of the spoon causes the bait, in making its major wobbling movement, to tremble or produce minor vibrations which additionally obscure the exact nature of the bait and make more natural the actual movements of a fish in the water.

The preferred manner of producing the bait above described is as follows. The center plate is stamped, cast or otherwise made to the form indicated in Fig. 4 except that the slot 15 and holes 16 and 29 are not at first formed therein. Next the holes 29 are bored; then the staple 28 is inserted through the holes 29 and its ends positioned in the hole 13 and the said ends are then flattened or upset. Next, the center plate, with the applied staple 28, by dipping or otherwise, is coated with the cementitious material such as acetone which forms a complete coating 31 over the entire plate and forms webs 31' in the holes 13, thereby embedding the upset ends of the cement coating and firmly anchors the staple. Of course, the upset ends 30, by resistance to movement through the small holes 29, further anchor the staple. Next, the slot 15 and rivet holes 16 are formed in the lip or flange 14.

The plate 19 and spoon 25, assembled as shown in Fig. 7, are then applied to the center plate by the application of the rivet 23, and the side plates 33 are applied, as shown in Figs. 1, 2 and 3. The edges of the plates 33 may be secured to the center plate by the further application of the cementitious material or by the cementitious material already applied. Acetone or similar cement, of course, quite rapidly hardens and forms practically an integral part of the center plate and side plates. Acetone is a heavy fluid material and, in practice, I have found that the web 31' will be formed in the rear hole 13 to embed the upset ends 30 of staple 28 due apparently to the fact that the upset ends stop the outward flow of the cement; whereas, in the unobstructed holes 13, the webs indicated will not be formed.

From the foregoing it will be understood that the preferred form of the device illustrated is capable of modifications within the scope of the invention herein disclosed and claimed.

What I claim is:

1. A fish lure body provided at its front end with a depending lip flange, a metallic line-attaching plate secured to said lip flange and formed with a neck and outward of said neck with a line-attaching eyelet, and a spoon secured on said neck with freedom for wobbling movements in respect to said attaching plate and lure body.

2. In a fish lure, a center plate of non-metallic material provided at its front end with a depending lip flange, a metallic line-attaching plate secured to said lip flange, said plate at its front end having a neck and a line-attaching eyelet, and a spoon applied on said neck.

3. In a fish lure, a center plate provided at its front end with a depending longitudinally slit lip, a metallic line-attaching plate inserted in the slot of said lip flange and rigidly secured to the latter, said plate at its front end having a neck and a projecting line-attaching eyelet, and a spoon applied on said neck with freedom for wobbling movements in respect thereto and in respect to the lure body.

4. In a fish lure, a center plate provided at its rear portion with an anchoring hole, a U-shaped metallic staple inserted through said center plate and having upset ends within said anchoring hole, and a fish hook applied to the depending portion of said staple.

5. The structure defined in claim 4 in which said center plate is coated with a hardened cementitious material that embeds the upset ends of said staple within said anchoring hole.

6. The structure defined in claim 4 in further combination with concavo-convex side plates applied to the opposite sides of said center plate with a fluid-tight joint and forming an air space within said lure body.

7. In a fish lure, a body member provided at its front end with a depending lip flange formed with a longitudinal slot, a metallic line-attaching plate secured in the slot of said lip flange and formed with a neck and outward of said neck with a line-attaching eyelet, and a spoon secured on said neck.

8. The structure defined in claim 7 in which said body member is of non-metallic material, and said metallic line-attaching plate is secured to said lip flange by a rivet and is provided at its rear end with a depending perforated portion for the application thereto of a fish hook.

9. A fish lure body provided at its front end with a rigidly secured but projecting line-attaching plate formed with a neck with a projecting eyelet for the attachment of a line thereto, and a spoon applied on said neck back of said eyelet and there held for limited lateral wobbling movements but against rotation on said neck.

KARL R. LARSON.